United States Patent
Itoh et al.

[11] Patent Number: 5,973,759
[45] Date of Patent: Oct. 26, 1999

[54] LIQUID CRYSTAL PROJECTOR

[75] Inventors: Osamu Itoh; Shoichi Hirota; Masaya Adachi, all of Hitachi, Japan

[73] Assignee: Hitachi, Ltd., Tokyo, Japan

[21] Appl. No.: 09/136,309

[22] Filed: Aug. 19, 1998

[30] Foreign Application Priority Data

Aug. 21, 1997 [JP] Japan ..................................... 9-225267

[51] Int. Cl.$^6$ ............................................... G02F 1/1335
[52] U.S. Cl. ................................. 349/5; 349/8; 349/132; 349/99; 349/121
[58] Field of Search ................................. 349/5, 7, 8, 41, 349/96, 99, 117, 119, 121, 132, 177; 353/31, 34, 122; 348/751, 752; 345/90

[56] References Cited

U.S. PATENT DOCUMENTS

| | | | |
|---|---|---|---|
| 5,092,664 | 3/1992 | Miyatako et al. ......................... 349/5 |
| 5,267,029 | 11/1993 | Kurematsu et al. ..................... 348/751 |
| 5,570,209 | 10/1996 | Usui et al. ................................. 349/5 |

*Primary Examiner*—Hung Xuan Dang
*Assistant Examiner*—Tai V. Duong
*Attorney, Agent, or Firm*—Antonelli, Terry, Stout & Kraus, LLP

[57] ABSTRACT

A liquid crystal projector having a high contrast ratio has an optical system including, for each color, a liquid crystal display device, a drive device for driving the liquid crystal display device and a polarization device, and a light source. The liquid crystal display device has active devices connected to reflective electrodes. Driving voltages applied to pixels have different polarities in every row. The liquid crystal layer is aligned at an angle from 75° to 105° to the direction of an electric field between electrodes. An optical rotator is provided between the liquid crystal display device and the polarization device.

7 Claims, 8 Drawing Sheets

ANGLE (DEG) BETWEEN
INTERELECTRODE ELECTRIC FIELD
DIRECTION AND ALIGNMENT DIRECTION

DEVIATION VALUE (NM)
OF RETARDATION

LIQUID CRYSTAL PROJECTOR

BACKGROUND OF THE INVENTION

A liquid crystal projector (ECB (Electrically Controlled Birefringence) projector) for producing a display by using an electrically controlled birefringence effect can perform active matrix addressing with a low driving voltage and, therefore, has a characteristic such that the number of pixels can be easily increased and the size of the substrate can be easily reduced.

A liquid crystal display device, a polarization beam splitter, and a dichromic prism forming the ECB liquid crystal projector are arranged so that four sides of the components are disposed in parallel in order to reduce the size and weight of the liquid crystal projector.

In the ECB liquid crystal projector, light is polarized and passes through the liquid crystal display device and an optical system. The polarization beam splitter transmits one of two linearly polarized light beams whose electric vector is parallel to the four sides and reflects the other light beam. If the alignment direction of the liquid crystal is set at 45° from the four sides in the polarization beam splitter, the light entering the polarization beam splitter can be modulated between the two linearly polarized light beams, so that a high contrast ratio can be obtained. In this case, the alignment direction of the liquid crystal is inclined at 45° from the alignment direction of pixels of the liquid crystal display device.

Since the size of the liquid crystal display device used for the ECB liquid crystal projector is as small as about (1.4× 1.4) inches, the interval between electrodes is extremely narrow, such as 2 μm or narrower. Consequently, in the case where a scanning line rate polarity inversion drive is used for applying driving pulses of different polarities to every pixel row, a strong electric field is generated between electrodes.

A liquid crystal molecule receives a torque from the electric field so that the axis of the molecule is pointed toward the interelectrode electric field and a part (interelectrode domain) in which the liquid crystal alignment is disturbed occurs between and around the electrodes.

Light is leaked from the interelectrode domain and the brightness in dark representation increases, so that the contrast ratio decreases.

In Japanese Patent Application Laid-open No. 8-334770, pixels are inclined at 45° from the four sides of a liquid crystal display device. However, in this case as well, the interelectrode domain is not completely eliminated and an interelectrode domain occurs on one side of each pixel.

SUMMARY OF THE INVENTION

The number of pixels of the ECB liquid crystal projector is being increased and the size of the substrate is being reduced. Accordingly, the interval between electrodes is being narrowed and the electric field between the electrodes is increasing. Thus, it is expected that the deterioration in the contrast ratio due to the interelectrode domain will become more serious.

In order to reduce the interelectrode domain without changing the pixel construction of the liquid crystal display device, the alignment direction of the liquid crystal has to be in parallel to the four sides of the liquid crystal display device. In order to satisfy the condition for a high contrast ratio (the angle between the alignment direction of the liquid crystal and the four sides of the polarization beam splitter is 45°), it is necessary to incline the polarization beam splitter at 45° to the liquid crystal display device.

In order to make light enter the whole liquid crystal display device in a state where the polarization beam splitter is inclined at 45°, the polarization beam splitter has to be enlarged by a corresponding amount. Since the light path is inclined at 45°, the size of the whole ECB liquid crystal projector is also increased.

It is therefore an object of the invention to provide an ECB liquid crystal projector in which deterioration in the contrast ratio due to light leakage from an interelectrode domain is prevented while maintaining a small size and a light weight.

The gist of the invention for achieving this object is as follows.

[1] A liquid crystal projector is provided with an optical system having a liquid crystal display device, a driving device for driving the liquid crystal display device, and a polarization device, and a light source, wherein the liquid crystal display device has an active device connected to a reflective electrode, driving voltages which are applied to the pixels have different polarities in every row of pixels, a liquid crystal layer is aligned at an angle of from 75° to 105° to the direction of an electric field between electrodes, and an optical rotator is provided between the liquid crystal display device and the polarization device.

[2] In the above-mentioned projector, the four sides of the liquid crystal display device are parallel to the electric vector of linearly polarized light produced by the polarization device and the optical rotator changes the linearly polarized light produced by the polarization device by 45° to the alignment direction of the liquid crystal display device.

[3] In the foregoing projector, the liquid crystal layer is processed so that its alignment direction is inclined at 90° to the direction of the electric field between electrodes and the optical rotator rotates the electric vector of the linearly polarized light which is reflected by the reflective electrode of the liquid crystal display device and enters the polarization device by 45°.

[4] In the foregoing projector, the optical rotator is a birefringent medium having a twist structure, the twist angle of the twist structure being 45°, and an optical major axis on an adjacent face of the polarization device is parallel to or perpendicularly crosses the electric vector of the linearly polarized light produced by the polarization device.

[5] In the foregoing projector, one or more birefringent films are provided between the liquid crystal display device and the optical rotator, the slow axis of the birefringent film is parallel to or perpendicularly crosses the alignment direction of the liquid crystal layer, and synthesized retardations of the birefringent film and the liquid crystal layer coincide with each other within 10 nm at 0.5 nλ of a main wavelength region of incident light, when (n) is set to an integer, λ is set to the wavelength of light, and an arbitrary voltage $V_B$ is applied to the liquid crystal layer.

[6] In the foregoing projector, the birefringence Δn of the thickness (d) of the optical rotator and the wavelength λ is set so as to satisfy the relationship $4d \cdot \Delta n/\lambda = \sqrt{(4m^2-1)}$, where m is an integer at a main wavelength λ of incident light.

According to the invention, a disturbance in the liquid crystal alignment due to an interelectrode electric field is extremely reduced for the following reasons.

FIG. 11 is a schematic cross section including two reflective electrodes 46 to which driving voltages of different polarities are applied in a conventional liquid crystal projector. The diagram shows a state where an interelectrode domain occurs.

A liquid crystal alignment direction 77 is parallel to the direction of the interelectrode electric field 51. In a normal part spaced from the end, an electric field 52 is produced perpendicularly to the substrate plane and the alignment of the liquid crystal molecules 55 in the center of the electrode is changed so that the molecule axis is inclined relative to the substrate plane.

On the contrary, the alignment of liquid crystal molecules 53 between electrodes is parallel to the substrate plane due to the interelectrode electric field 51, which is parallel to the substrate plane. The alignment of liquid crystal molecules 54 near the end of the electrode is influenced by the liquid crystal molecules 53 between the electrodes and the liquid crystal molecules 55 in the center of the electrode. The deformation between the liquid crystal molecules 53 between the electrodes and the liquid crystal molecules 55 in the center of an electrode is that of the bend spray type.

FIG. 10 is a plan view of a conventional liquid crystal display device and shows a case where the alignment direction 77 of the liquid crystal layer is inclined at 45° to the interelectrode electric field 51.

When one considers the alignment state of the liquid crystal molecule 53 between two electrodes and the liquid crystal molecule 55 in the center of an electrode, the deformation between them is that of the bend spray type in a manner similar to the case of FIG. 11.

FIG. 12 is a diagram showing the occurrence of a domain in the liquid crystal projector of the invention and illustrates a case where the alignment direction 77 (perpendicular to the paper face) of the liquid crystal layer is inclined at 90° to the direction of the interelectrode electric field 51.

In a manner similar to FIGS. 10 and 11, when consideration is given to the alignment state of the liquid crystal molecules 53 between electrodes and the liquid crystal molecules 55 in the center of an electrode, the deformation between them in the device which incorporates the invention is different from that of FIGS. 10 and 11. It is a deformation of a twist type.

By setting the alignment direction of the liquid crystal layer so as to be inclined at 90° to the direction of the interelectrode electric field, as mentioned above, a disturbance in the alignment of the liquid crystal layer caused by the electric field between pixel lines and a change in alignment of the liquid crystal at the normal part become different. That is, the change in optical characteristics of the deformation of the twist type is smaller than that of the deformation of the bend spray type. As a result, the distribution range of interelectrode domains can be reduced.

When the alignment direction of the liquid crystal layer is set as mentioned above, the alignment direction of the liquid crystal is turned by 45° from the conventional alignment direction. The azimuth of the polarized light entering the polarization beam splitter is accordingly turned by 45°.

As described above, in order to obtain a high contrast, the electric vector of the linearly polarized light entering the liquid crystal display device has to be set at 45° to the alignment direction of the liquid crystal layer. While keeping the arrangement of the optical system in the conventional manner, an optical rotator is arranged between the polarization beam splitter and the liquid crystal display device in order to compensate for the 45° turn of the azimuth of the polarized light. The angle of the optical rotator is set to 45°.

As optical rotators, there are an optical rotator whose principle is optical activity and an optical rotator whose principle is a twist-structured wave guide.

According to the former rotator, the rotation direction of the polarization azimuth is constant irrespective of the incident direction of light. On the contrary, in the latter rotator, the rotation direction of the polarized light azimuth is inverted when the incident direction of light is inverted. That is, in the latter, the polarized light azimuth rotates so as to be along the twist structure. In either case, when the liquid crystal display device is designed according to the characteristics of either optical rotator, a display with a high contrast ratio can be obtained.

BRIEF DESCRIPTION OF THE DRAWINGS

These and other objects, features and advantages of the present invention will be understood more clearly from the following detailed description when taken with reference to the accompanying drawings, wherein.

DESCRIPTION OF THE PREFERRED EMBODIMENTS

The invention will be specifically described on the basis of various embodiments.

[Embodiment 1]

Figure 1:
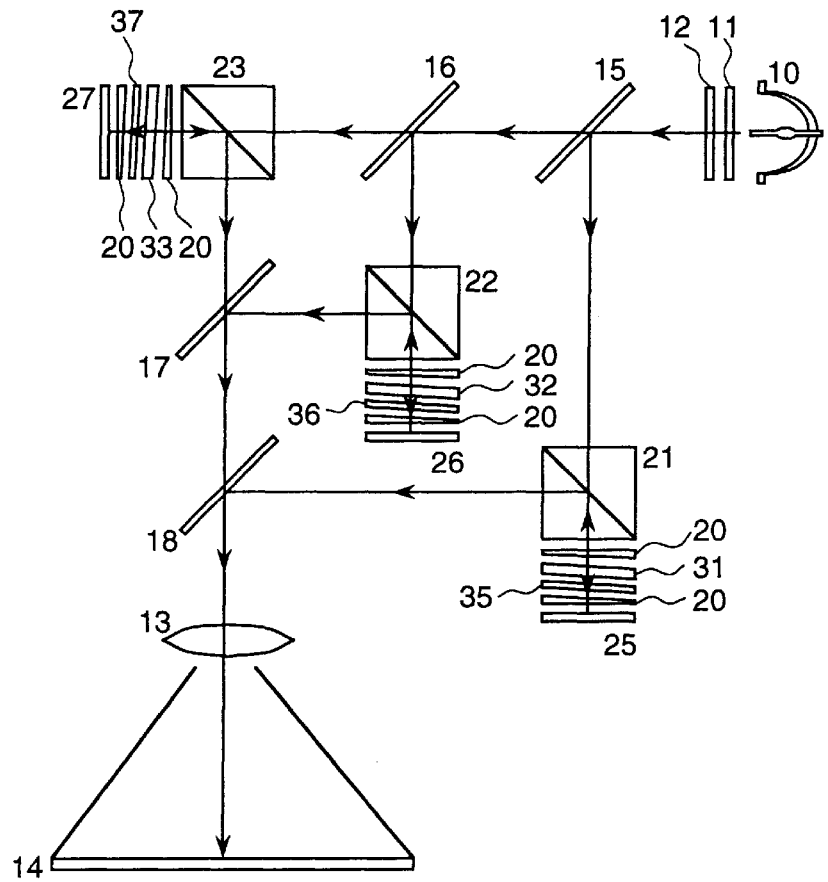
FIG. 1 is a schematic diagram showing the construction of a liquid crystal projector according to the invention.

FIG. 1 shows the construction of a liquid crystal projector according to the invention. Natural light emitted from a light source 10 is dispersed by a dichroic mirror $R_1$ 15 and a dichroic mirror $B_1$ 16 into light beams in the wavelength regions corresponding to the three colors of R, B, and G. The dispersed light beams are directed along respective light paths. The light beam of each wavelength is separated into two linearly polarized light beams by a polarization beam splitter R 21, B 22, or G 23, and in each case one of the two light beams is led to a liquid crystal display device R 25, B 26, or G 27.

Optical rotators R 31, B 32, and G 33 and birefringent films R 35, B 36, and G 37 are arranged between the liquid crystal display devices R, B, and G and the polarization beam splitters R, B, and G from the side of the polarization beam splitters R, B, and G, respectively.

In order to reduce the influence of an interface reflection, the optical rotators R, B, and G and the birefringent films R, B, and G are arranged so that the plane normal line direction is inclined from the light incident direction by using wedge glasses 20. The light reflected by the liquid crystal display devices R, B, and G again enters the polarization beam splitters R, B, and G and is dispersed into two linearly polarized light beams. One of them is directed to a dichroic mirror $R_2$ 18 or $B_2$ 17 and the light paths of the light beams at the respective wavelengths are integrated. After that, the light is projected onto a screen 14 via a projection lens 13.

Figure 2:
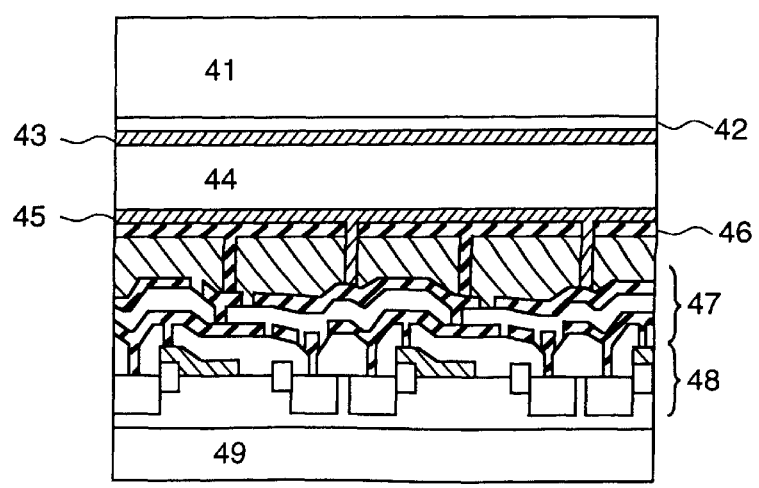
FIG. 2 is a cross-section showing the construction of a liquid crystal display device of the invention.

FIG. 2 shows a schematic cross section of the liquid crystal display device of the invention. An MOS (Metal Oxide Semiconductor) device 48 is formed on the surface which is close to a liquid crystal layer 44 of a silicon substrate 49. Respective MOS devices are connected to the reflective electrode 46. An upper transparent substrate 41 is made of low thermal expansive borosilicate glass and has a common electrode 42 made of ITO (indium tin oxide) on the face close to the liquid crystal layer 44. The liquid crystal layer 44 is homogeneously aligned. The thickness of the liquid crystal layer 44 is 3.5 μm and the retardation (Δn·d) of the liquid crystal layer 44 when no voltage is applied is 290 nm at the wavelength of 550 nm.

Figure 9:
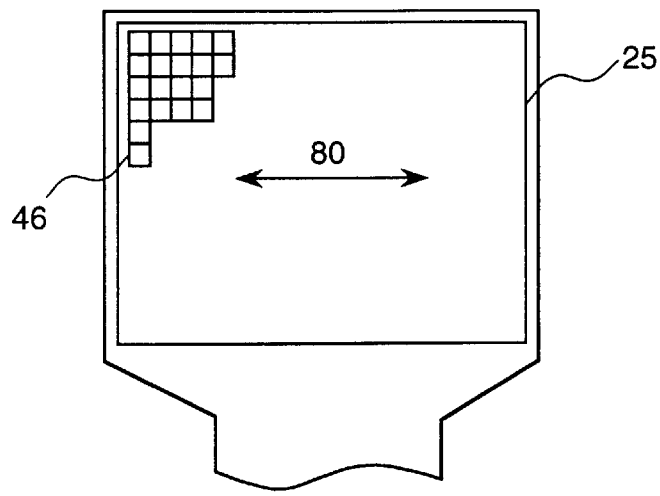
FIG. 9 is a diagram showing the construction of a liquid crystal display device of a liquid crystal projector according to the invention.
Figure 10:
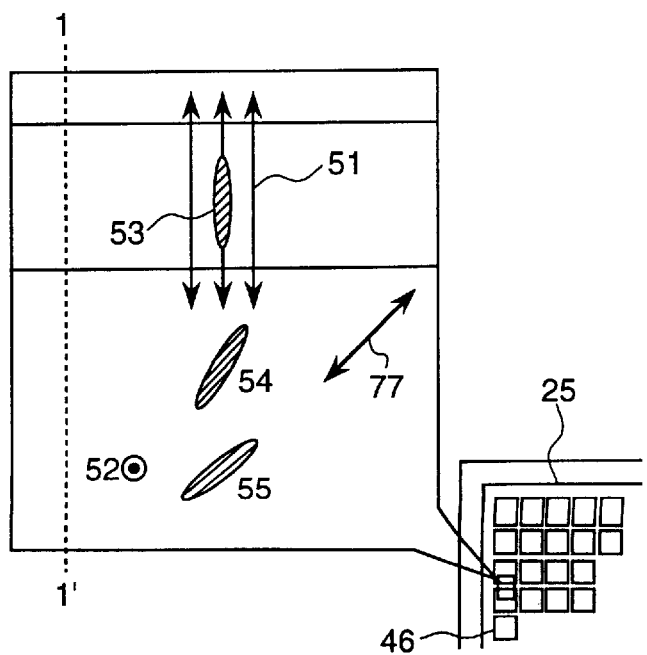
FIG. 10 is a diagram showing the occurrence of a domain in a conventional liquid crystal projector.
Figure 11:
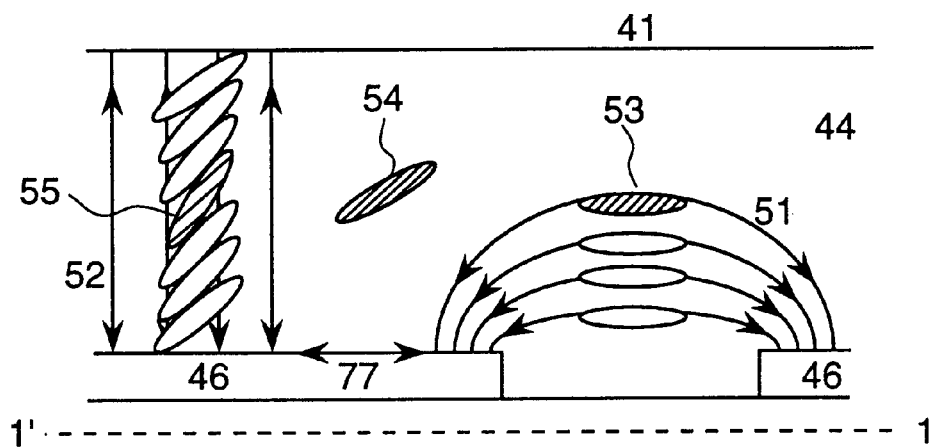
FIG. 11 is a diagram showing the occurrence of a domain in a conventional liquid crystal projector.
Figure 12:
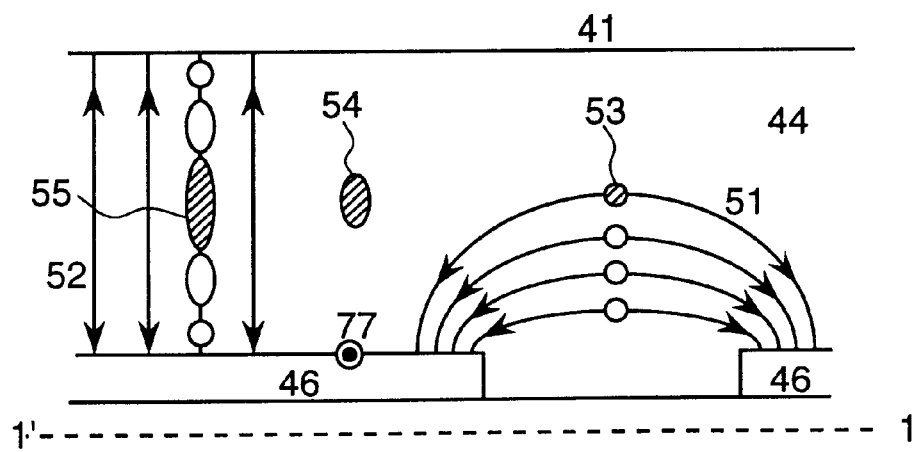
FIG. 12 is a diagram showing the occurrence of a domain in a liquid crystal projector according to the invention.

The alignment direction of the liquid crystal layer 44 is parallel to the electrode line direction 80 shown in FIG. 9. The alignment direction is perpendicular with respect to the direction of the interelectrode electric field.

Figure 3:
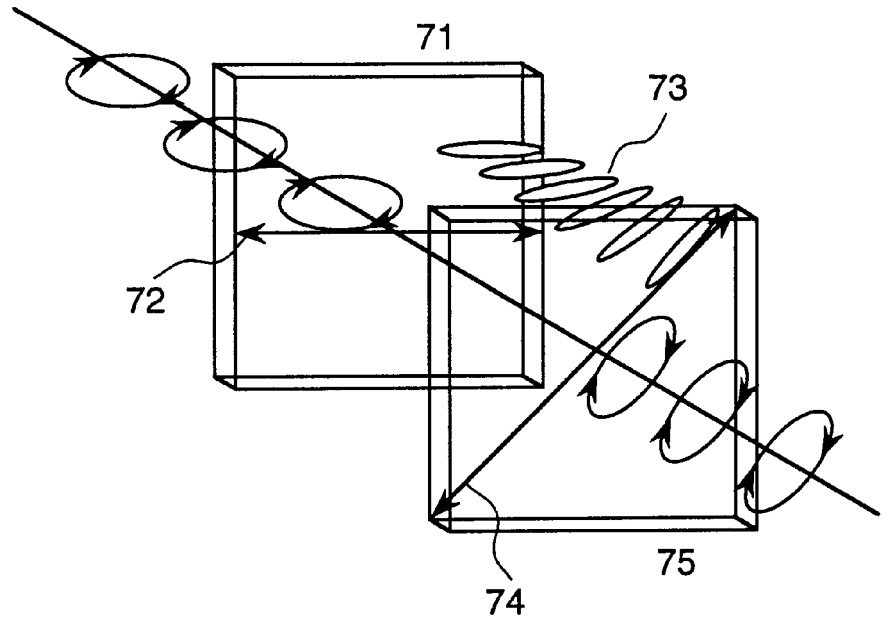
FIG. 3 is a diagram showing the action of an optical rotator in a liquid crystal display device according to the invention.
Figure 4:
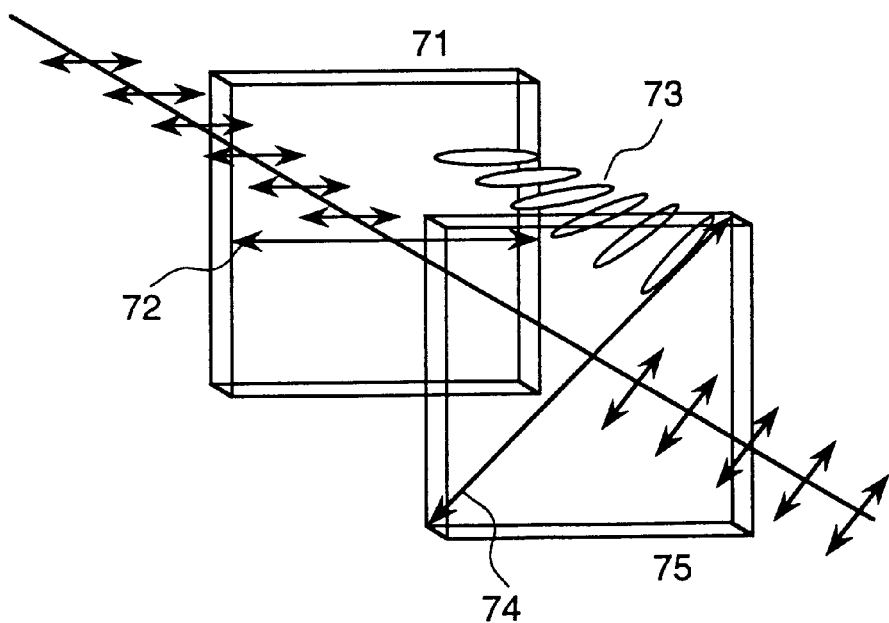
FIG. 4 is a diagram showing the action of an optical rotator in a liquid crystal display device according to the invention.
Figure 5:
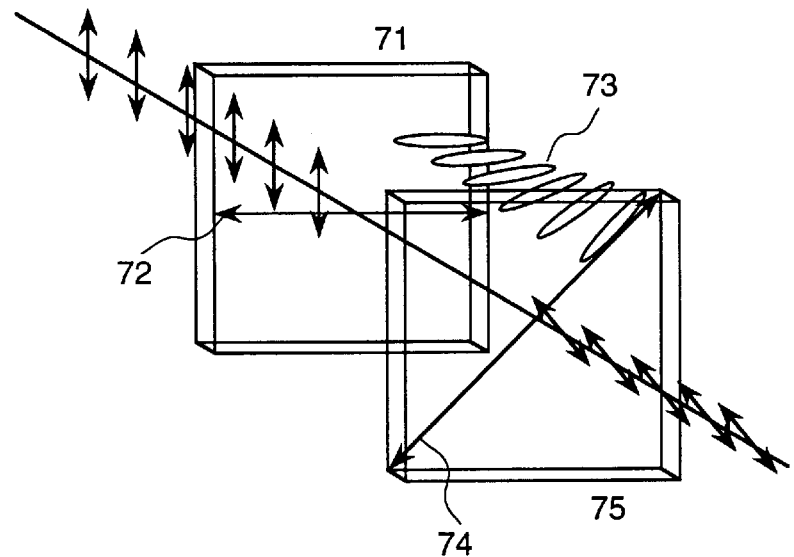
FIG. 5 is a diagram showing the action of an optical rotator in a liquid crystal display device according to the invention.

The structure and action of the optical rotators are shown in FIGS. 3 to 5. The optical rotator is a TN (Twisted Nematic) liquid crystal display device and is constructed by two transparent substrates 71 and 75 and a liquid crystal layer (liquid crystal rotator 73) held by between substrates 71 and 75. The twist angle is 45°. The alignment direction 72 on the transparent substrate 71 side of the liquid crystal rotator 73 is parallel to the four sides of a dichroic prism on the side adjacent to the dichroic prism. The alignment direction 74 on the transparent substrate 75 side of the liquid crystal rotator 73 is inclined at 45° to the four sides of the liquid crystal display device.

The optical rotator satisfies the wave guide condition in a main wavelength region of the incident light. That is, as shown in FIG. 3, the major axis of an ellipse is turned by 45° in the twist direction while keeping the ellipticity of incident polarized light (generally, elliptically polarized light).

When linearly polarized light whose electric vector is parallel to the alignment direction enters, as shown in FIG. 4, the light is transformed to linear polarized light whose electric vector is parallel to the alignment direction 74 on the outgoing side. When linearly polarized light whose electric vector is perpendicular to the alignment direction enters, as shown in FIG. 5, the light is transformed to linearly polarized light whose electric vector is perpendicular to the alignment direction 72 on the outgoing side.

The wave guide condition is described, for example, in the paper by C. H. Gooch, H. A. Tarry, et al., J. Phys. D: Appl. Phys. Vol. 8, 1975, pp. 1575 to 1584. In order to rotate light of the wavelength λ only by 45° by a wave guide, it is sufficient to set the thickness (d) of the liquid crystal rotator 73 and the birefringence Δn at the wavelength λ so as to satisfy the equation [1].

$$4d \cdot \Delta n / \lambda = \sqrt{(4m^2 - 1)} \qquad [1]$$

where, m is an arbitrary integer.

(d) and Δn of each of the optical rotators R, B, and G are set so as to satisfy the equation [1] at the central wavelength of the wavelength region of light entering the optical rotator. Alternatively, they are set so as to satisfy the equation [1] at a wavelength where the intensity of incident light is maximum in the wavelength region.

The former method is employed here, and (d) and Δn are set so as to satisfy the equation [1] at 650 nm, 550 nm, and 450 nm as central wavelengths of light in the wavelength regions corresponding to R, G, and B, respectively. That is, (m) was set to 4 and Δn·d of the optical rotators R, G, and B was set to 903 nm, 765 nm, and 626 nm at the respective wavelengths.

The display principle of the liquid crystal projector of the invention will be described hereinbelow by taking light entering the liquid crystal display device R as an example.

Figure 6:
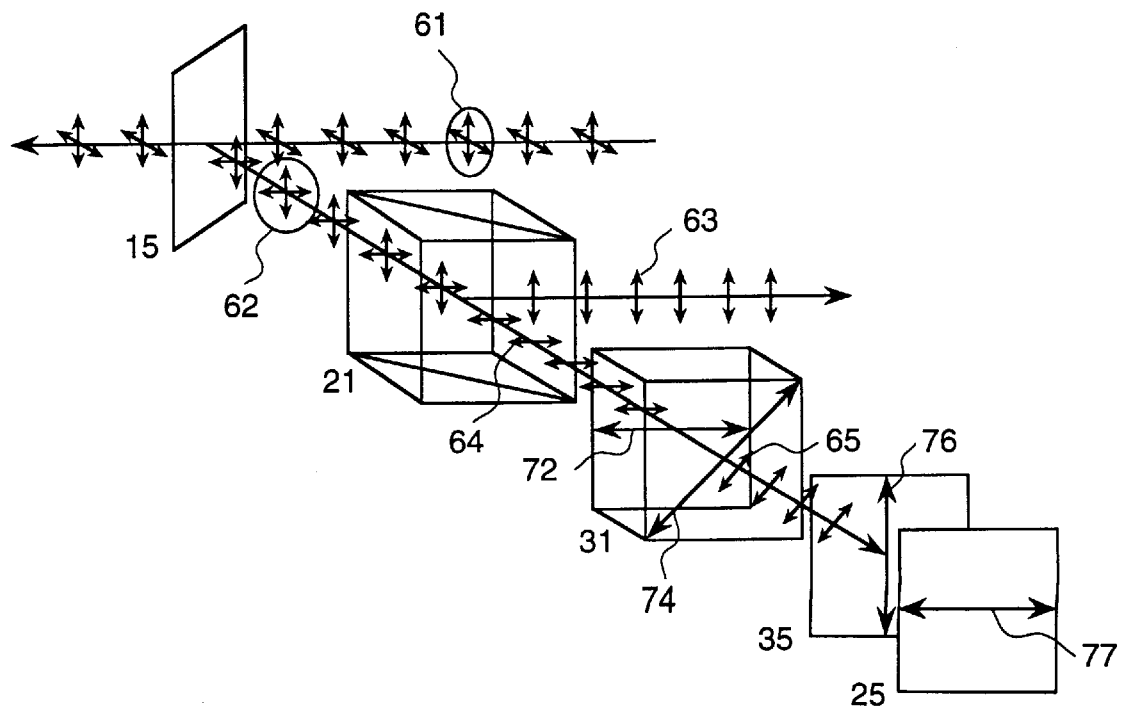
FIG. 6 is a diagram showing a change in the polarization state of light of the liquid crystal display device of the invention and indicating a process on light emitted from a light source prior to its entering a birefringent film.

As shown in FIG. 6, natural white light 61 emitted from a light source is dispersed by the dichroic mirror $R_1$ 15 and red light 62, representing light in the wavelength region of R, travels toward the polarization beam splitter R 21 and is split into P polarized light 63 and S polarized light 64.

The polarization beam splitter R 21 changes the course of the P polarized light by 90° but does not change the course of the S polarized light. Consequently, only S polarized light travels toward the optical rotator R 31. The electric vector of the S polarized light 64 is parallel to the alignment direction 72 of the liquid crystal rotator on the polarization beam splitter R 21 side. The electric vector of polarized light 65 which passes through the optical rotator R 31 is rotated by 45° in the direction of the twist of the optical rotator R 31. The angle formed between the electric vector of the polarized light 65 entering the birefringent film R 35 and the slow axis 76 of the birefringent film R 35 is 45°.

The light from the birefringent film R 35 enters the liquid crystal display device R 25, reflected by a reflective electrode, and again passes through the birefringent film R 35. At the time of bright representation, the phase difference corresponding to ½ wavelength is given to the light in this process and the electric vector is rotated by 90°. At the time of dark representation, a phase difference is not substantially applied to the light, so that the electric vector is maintained.

Figure 7:
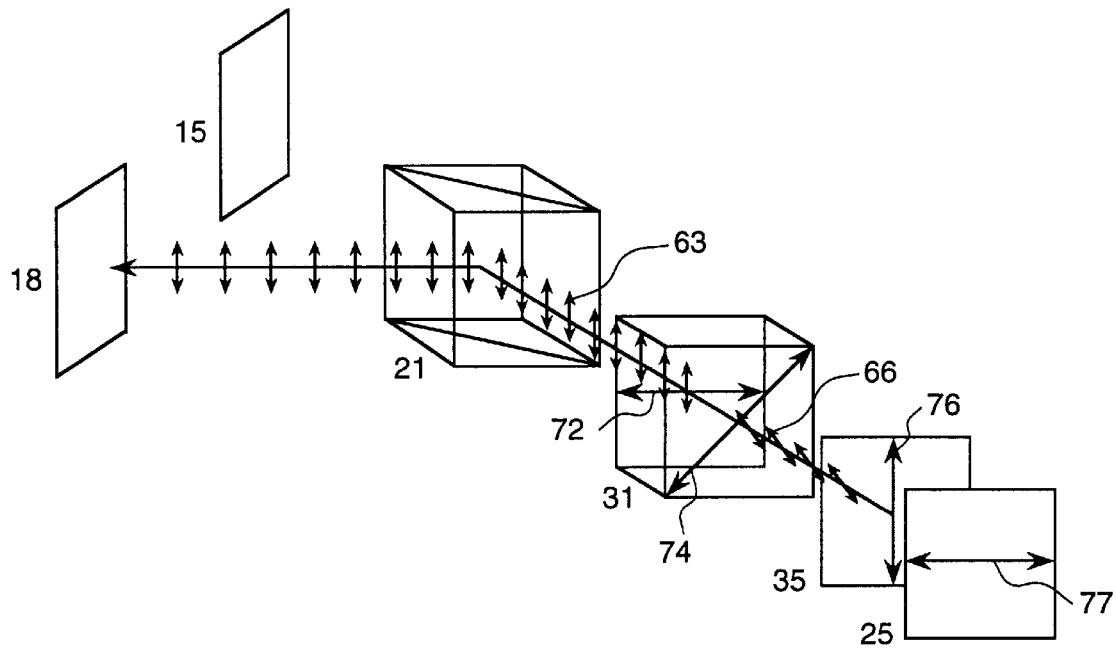
FIG. 7 is a diagram showing a change in the polarization state of light of the liquid crystal display device of the invention and indicating a process on light which comes out from the birefringent film and passes through a polarization beam splitter at the time of bright representation.

FIG. 7 shows the change in the polarization state of the light from the birefringent film R 35 at the time of bright representation. The electric vector of the outgoing light (linearly polarized light) from the birefringent film R 35 perpendicularly crosses the alignment direction 74 of the liquid crystal rotator on the birefringent film R 35 side at the time of bright representation. The electric vector is rotated by 45° in the direction of the twist of the optical rotator when the polarized light passes therethrough and the light becomes P polarized light 63 which travels toward the polarization beam splitter R 21.

The polarization beam splitter R 21 changes the course of the P polarized light 63 by 90° and directs the light to the dichroic mirror $R_2$ 18 and further to a projection lens, so that the bright representation is obtained.

Figure 8:
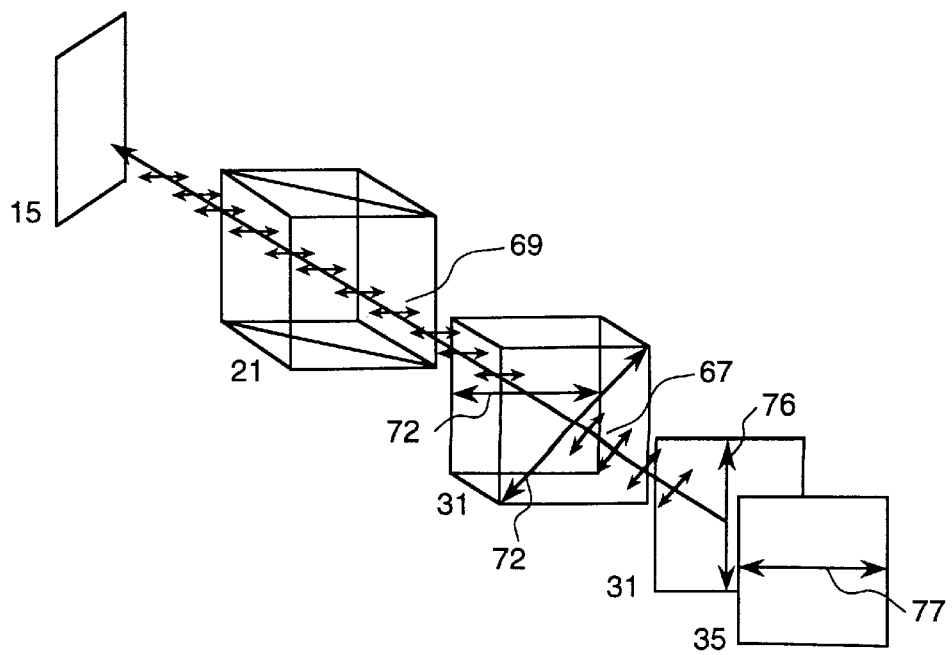
FIG. 8 is a diagram showing a change in the polarization state of light of the liquid crystal display device of the invention and indicating a process on light which comes out from the birefringent film and passes through the polarization beam splitter at the time of dark representation.

FIG. 8 shows the change in the polarization state of the outgoing light from the liquid crystal display device R at the time of dark representation. The electric vector of the light (linearly polarized light) from the birefringent film R 35 is parallel to the alignment direction 72 of the liquid crystal rotator on the birefringent film R 35 side at the time of dark representation. The electric vector is rotated by 45° in the direction of the twist of the optical rotator R 31 when the polarized light passes therethrough. The light becomes S polarized light and travels toward the polarization beam splitter R 21.

The polarization beam splitter R 21 does not change the course of the S polarized light 69 so that the S polarized light 69 travels to the dichroic mirror $R_1$ 15 and the dark representation is obtained (since the light does not travel toward the dichroic mirror $R_2$ 18).

In order to reduce the brightness at the time of dark representation and to obtain a high contrast ratio while keeping the electric vector of the outgoing light (linearly polarized light) from the birefringent film at the time of dark representation, the synthesized retardation of the birefringent film and the liquid crystal layer is set to 0 nm at the time of dark representation. The retardation of the birefringent film is set to be equal to the retardation of the liquid crystal layer at the time of dark representation and the slow axis of the birefringent film and the alignment direction of the liquid crystal layer are arranged so as to perpendicularly cross each other. This operation will be explained more specifically.

The application voltage for producing the dark representation is set to 1.3V. The retardation of the liquid crystal layer in each of the liquid crystal display devices R, G, and B is 0.78 times that of the case when no voltage is applied, that is, 226 nm at the wavelength 550 nm.

A birefringent film made of polycarbonate, in which the wavelength dependency of the retardation is similar to that of the liquid crystal layer, is used. When it is assumed that the retardation at the wavelength 550 nm is 1, the retardation at the wavelength 450 nm is 1.053 in the liquid crystal layer and is 1.071 in the birefringent film made of polycarbonate. The retardation at the wavelength 650 nm is 0.968 in the liquid crystal layer and is 0.960 in the birefringent film made of polycarbonate.

Since the central wavelength of light in the wavelength region corresponding to R is 650 nm, the retardation of the birefringent film R is set so as to be equal to that of the liquid crystal layer of the liquid crystal display device R at 650 nm. Similarly, the central wavelengths of light in the wavelength regions corresponding to G and B are 550 nm and 450 nm, respectively, the retardations of the birefringent films G and B are set so as to be equal to those of the liquid crystal layers of the liquid crystal display devices G and B at 550 nm and 450 nm, respectively.

The retardations at the wavelength 550 nm of the birefringent films R, G, and B were set to 228 nm, 226 nm, and 222 nm, respectively, as mentioned above.

The liquid crystal projector produced as mentioned above was driven by the scanning line rate polarity inversion drive. When the performances were measured on a screen, the contrast ratio was 100:1 or higher and the surface brightness of the bright representation part was 180 cd/m².

By setting the alignment direction of the liquid crystal layer so as to be perpendicular to the direction of the interelectrode electric field, arranging the pixel line and the four sides of the polarization beam splitter so as to be in parallel, and rotating the electric vector of the linearly polarized light emitted from the polarization beam splitter by 45° by using the optical rotator so that the electric vector is inclined at 45° from the alignment direction of the liquid crystal layer as mentioned above, the occurrence of a domain can be suppressed even when the scanning line rate polarity inversion drive is used and the contrast ratio of 100:1 or higher can be obtained.

Although the liquid crystal layer has a homogeneous alignment in the foregoing embodiment, the invention is not limited to such a structure. Even if a layer structure having a twist is used, by determining the slow axis of the birefringent film and the transmission axis of a polarizing plate by using the alignment direction of the liquid crystal layer close to the polarizing plate as a reference, similar effects can be obtained.

[Embodiment 2]

In the liquid crystal projector of the first embodiment, each of the optical rotators R, G, and B is replaced by a stack of plastic films having a twist structure. The stack of plastic films is a stack of four birefringent films each made of polycarbonate. The value of Δn·d of each film at the wavelength of 550 nm is 275 nm.

The slow axes of the four birefringent films lie between the two alignment directions (72 and 74) of the liquid crystal rotators of the first embodiment. One of the four birefringent films which is closest to the liquid crystal display device is arranged so that its slow axis is inclined at 5.6° from the alignment direction of the liquid crystal display device.

Similarly, the second, third, and fourth birefringent films from the above liquid crystal display device are arranged so that their slow axes are inclined at 16.9°, 28.1°, and 39.4° from the alignment direction of the liquid crystal display device, respectively.

When this liquid crystal projector was driven by the scanning line rate polarity inversion drive and the performances were measured on the screen, the contrast ratio of 100:1 or higher was obtained.

[Embodiment 3]

A few kinds of liquid crystal projectors were produced by changing the alignment direction of the liquid crystal layer in the liquid crystal projector of the first embodiment and their performances were measured. In addition to changing the alignment direction of the liquid crystal layer, the twist angle of the optical rotator was changed.

In the first embodiment, since the angle between the linearly polarized light from the polarization beam splitter and the alignment direction of the liquid crystal display device is 90°, the twist angle of the optical rotator was set to 45°.

In the third embodiment, when it is assumed that the angle between the linearly polarized light from the polarization beam splitter and the alignment direction of the liquid crystal display device is α°, the twist angle of the optical rotator is set to (α−45)°. That is, the linearly polarized light emitted by the polarization beam splitter is set so that the electric vector of the linearly polarized light is always rotated at 45° from the alignment direction when the light enters the liquid crystal display device.

Figure 13:
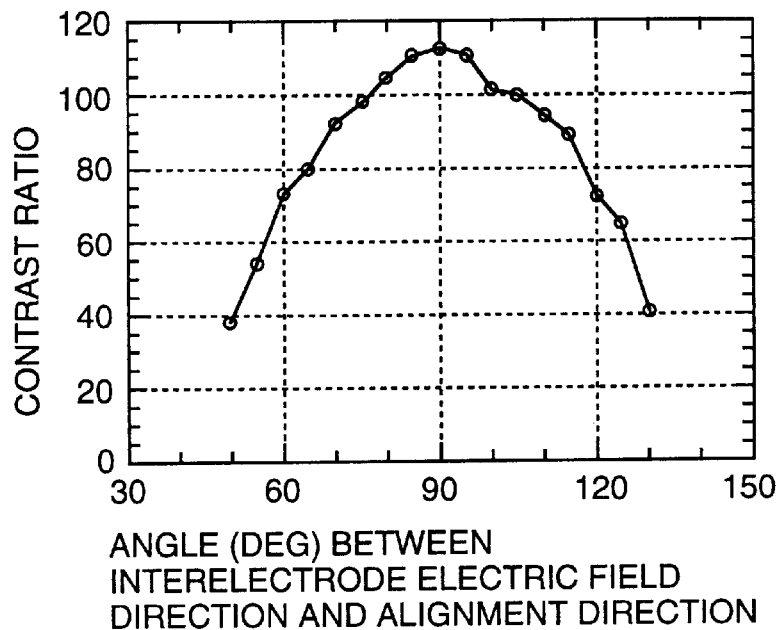
FIG. 13 is a graph showing the relation between an angle formed by an interelectrode electric field direction and an alignment direction and a contrast ratio.

FIG. 13 shows the contrast ratios in the alignment directions. The horizontal axis indicates the angle between the interelectrode electric field direction and the alignment direction. Although the contrast ratio of 100:1 or higher is necessary so that most of the users recognize that various actual images displayed have a sufficient picture quality, if the angle between the interelectrode electric field direction and the alignment direction ranges from 75° to 105°, the influence by the domain between electrodes is extremely small and the contrast ratio of 100:1 or higher can be obtained.

[Embodiment 4]

In the liquid crystal projector of the first embodiment, a few kinds of liquid crystal projectors were produced by changing the retardations of the birefringent films R, G, and B, and the display characteristics of the liquid crystal projectors were measured. That is, the synthesized retardations of the liquid crystal layer and the birefringent film, when a voltage for dark representation is applied, were changed.

When (n) is an arbitrary integer and λ is a major wavelength of light entering the birefringent film and the liquid crystal layer, it is ideal if the synthesized retardation of the birefringent film and the liquid crystal layer is 0.5 nλ at the time of dark representation. In the first embodiment, (n) was set to 0 and the retardations of the birefringent films R, G, and B were determined.

In the fourth embodiment, when a deviation of the synthesized retardation of the birefringent film R and the liquid crystal layer R from the ideal value (0 nm) is set to ΔR, that of the birefringent film G and the liquid crystal layer G is set to ΔG, and that of the birefringent film B and the liquid crystal layer B is set to ΔB, the retardations of the birefringent films R, G, and B were changed so as to satisfy ΔR=ΔG=ΔB.

Figure 14:
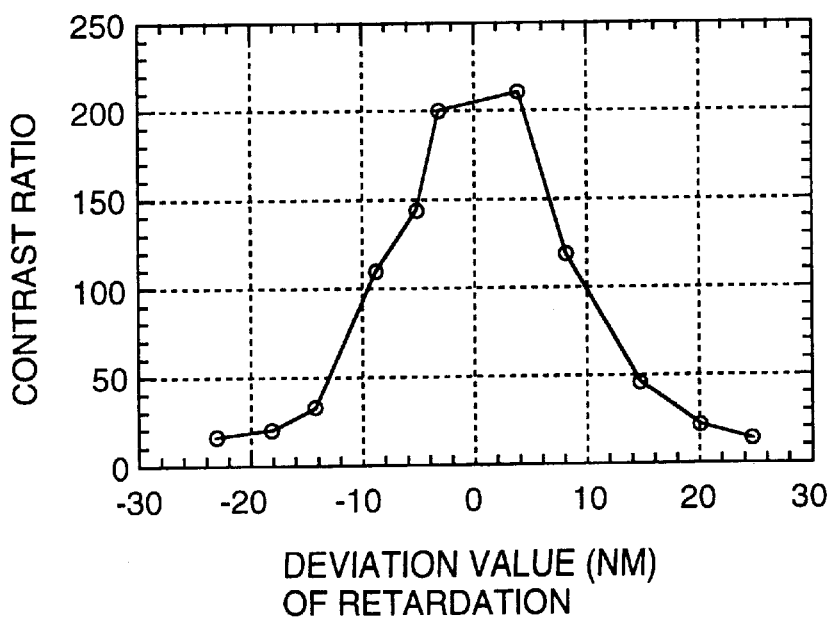
FIG. 14 is a graph showing the relation between a deviation in synthesized retardation and a contrast ratio.
Figure 15:
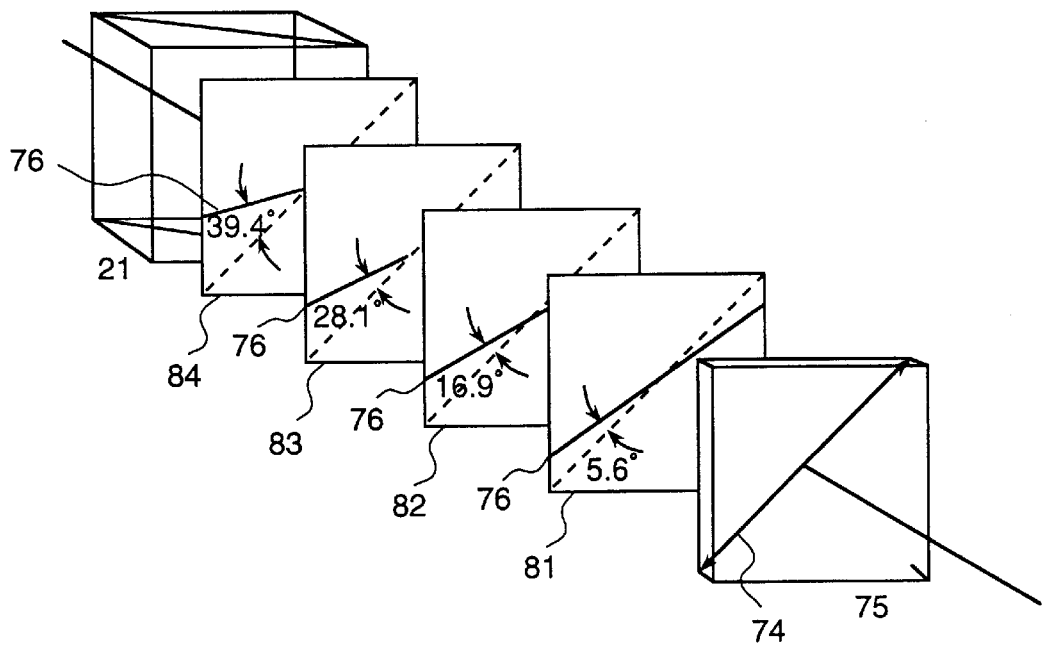
FIG. 15 is a diagram showing the structure of an optical rotator used for a liquid crystal projector of the invention.

FIG. 14 shows the result of measurement of changes in the contrast ratio. The horizontal axis of the graph indicates a deviation of a synthesized retardation of the birefringent film and the liquid crystal layer from the ideal value (0 nm). A contrast ratio of 100:1 or higher is necessary so that most of the users recognize that various actual images displayed have a sufficient picture quality.

It was proven from FIG. 14 that the contrast ratio of 100:1 or higher was obtained when the deviation from the ideal value (0 nm) is less than 10 nm.

Although the organic polymer films were used for the birefringent film and the polarizing film in the embodiments of the invention, similar effects can be also obtained by using birefringent and polarizing films made of a non-organic material. Further, by using a poly-silicon TFT as an active device, similar effects can be also obtained.

[Embodiment 5]

In the liquid crystal projector of the first embodiment, each of the optical rotators R, G, and B is replaced by a stack of plastic films having a twist structure. The stack of plastic films is a stack of two birefringent films made of polycarbonate. The value of Δn·d of each film at the wavelength 550 nm is 275 nm. One of the two birefringent films which is closer to the liquid crystal display device is shown as a first birefringent film 81 and the other is shown as a second birefringent film 82.

Figure 16:
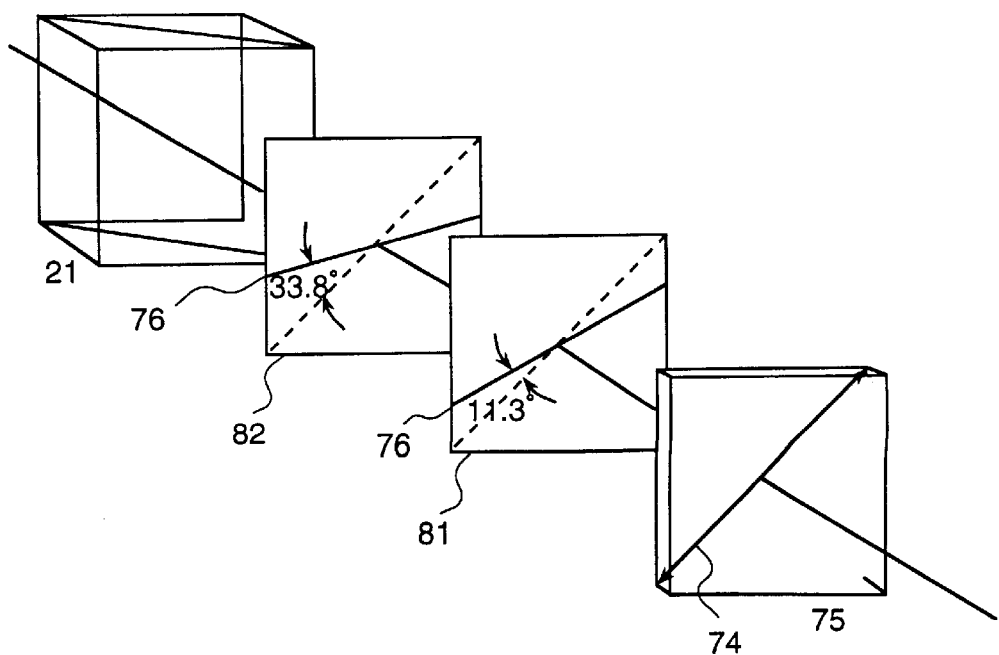
FIG. 16 is a diagram showing the structure of an optical rotator used for a liquid crystal projector of the invention.

Both of the slow axes of the two birefringent films are positioned between the two alignment directions (72 and 74) of the liquid crystal rotators of the first embodiment. The first birefringent film is arranged so that its slow axis is inclined at 11.3° from the alignment direction of the liquid crystal display device. Similarly, the second birefringent film is arranged so that its slow axis is inclined at 33.8° from the alignment direction of the liquid crystal display device. The azimuths of the slow axes of the birefringent films are shown in FIG. 16.

When the liquid crystal projector was driven by the scanning line rate polarity inversion drive and the performances were measured on a screen, a contrast ratio of 100:1 or higher was obtained.

[Embodiment 6]

In the liquid crystal projector of the first embodiment, each of the optical rotators R, G, and B was replaced by a polymer film having a twist construction. The polymer film is a polymer liquid crystal having a cholesteric phase and is formed by using a borosilicate glass as the substrate. In order to specify the alignment direction of the polymer liquid crystal on the face adjacent to the borosilicate glass, an alignment film made of a polyimide organic polymer is formed between the borosilicate glass and the polymer liquid crystal. The alignment film is processed by a rubbing method.

Besides the above film, a transparent organic polymer film also can be used as the substrate. A photopolymerizable organic polymer film also can be used as the alignment film.

The polymer film was formed by the following method. A solution was made by dissolving the polymer liquid crystal into a solvent and was formed in a film shape on the alignment film by a spin coat method. After the solvent was removed by heating, the film was further heated to a temperature at which the cholesteric phase was shown. After confirming that the whole surface had an uniform cholesteric phase, the temperature was slowly cooled to room temperature while keeping the twist alignment in the cholesteric phase.

For example, the polymer liquid crystal may be a polymer liquid crystal of a side chain type having a group of an asymmetric carbon and a mesogen group showing the liquid crystallizability.

By changing the ratio of the group having the asymmetric carbon and the mesogen group in the polymer liquid crystal, the birefringence and the twist pitch of the polymer liquid crystal were optimized. By adjusting the film thickness of the polymer liquid crystal, the twist angle of the polymer liquid crystal was set to 45°. The thickness (d) of the polymer liquid crystal and the birefringence an at the wavelength λ were set so as to satisfy the equation [1].

When the liquid crystal projector was driven by the scanning line rate polarity inversion drive and the performances were measured on a screen, a contrast ratio of 100:1 or higher was obtained.

[Embodiment 7]

In the liquid crystal projector of the first embodiment, each of the optical rotators R, G, and B was replaced by a twist-structured polymer film. The polymer film is made of a mixture of liquid crystal molecules having photopolymerizability, an optical rotating substance, and a polymerization initiator and is formed by using a borosilicate glass as a substrate. In order to specify the alignment direction of the photopolymerizable liquid crystal molecule in the face adjacent to the borosilicate glass, an alignment film made of a polyimide organic polymer was formed between the borosilicate glass and the polymer liquid crystal. The alignment film was aligned by a rubbing method.

Besides the above film, a transparent organic polymer film also can be used as the substrate. A photopolymerizable organic polymer film can be also used as the alignment film.

The polymer film was formed by the following method. A solution was made by solving the photopolymerizable liquid crystal molecule, the optical rotating substance, and the polymerization initiator into a solvent and was formed in a film state on the alignment film by a spin coat method. After the solvent was removed by heating, the film was further heated to a temperature at which the cholesteric phase is shown. After confirming that the whole surface had a uniform cholesteric phase, ultraviolet rays were irradiated, and the photopolymerizable liquid crystal molecules were polymerized. Thus, the polymer having the twist alignment similar to the cholesteric phase was obtained.

The photopolymerizable liquid crystal molecule may be, for example, a liquid crystal molecule having the acrylic group at the end of the molecule or a liquid crystal molecule having the acrylic group at both ends of the molecule.

By changing the mixing ratio of the photopolymerizable liquid crystal molecule and the optical rotating substance, the birefringence and a twist pitch of the polymer film were optimized. By adjusting the thickness of the polymer film, the twist angle of the polymer liquid crystal was set to 45°. The thickness (d) of the polymer liquid crystal and the birefringence $\Delta n$ at the wavelength $\lambda$ were set so as to satisfy the equation [1].

When the liquid crystal projector was driven by the scanning line rate polarity inversion drive and the performances were measured on a screen, the contrast ratio of 100:1 or higher was obtained.

COMPARISON EXAMPLE 1

In the liquid crystal projector of the first embodiment, the optical rotators R, G, and B were eliminated and the alignment direction of each of the liquid crystal layers of the liquid crystal display devices R, G, and B was inclined at 45° from the direction of the electrode line. The slow axis direction of the birefringent film was accordingly rotated only by 45° from the arrangement of the first embodiment so as to keep the relation that the slow axis direction perpendicularly crosses the alignment direction of the liquid crystal layer.

When the liquid crystal projector was driven by the scanning line rate polarity inversion drive and the performances were measured on a screen, the contrast ratio was 34:1.

By setting the alignment direction of the liquid crystal layer at 45° from the line direction of the electrodes as mentioned above, when the scanning line rate polarity inversion drive was used, a domain occurred and the contrast ratio deteriorated.

COMPARISON EXAMPLE 2

In the liquid crystal projector of the first embodiment, the optical rotators R, G, and B were removed and the alignment direction of each of the liquid crystal layers of the liquid crystal display devices R, G, and B was inclined at 90° from the electrode line direction. The slow axis direction of the birefringent film was rotated only by 90° from the arrangement of the first embodiment so as to keep the relation that the slow axis direction perpendicularly crosses the alignment direction of the liquid crystal layer. The alignment direction of the liquid crystal layer in this instance is parallel to the electric field direction between the electrode lines.

When the projector was driven by the scanning line rate polarity inversion drive and the performances were measured on the screen, the contrast ratio was 37:1.

By setting the alignment direction of the liquid crystal layer at 90° from the line direction of the electrodes, as mentioned above, when the scanning line rate polarity inversion drive was used, a domain was formed and the contrast ratio deteriorated.

COMPARISON EXAMPLE 3

In the liquid crystal display of the first embodiment, the optical rotators R, G, and B were removed and the liquid crystal display devices R, G, and B and the birefringent films R, G, and B were rotated at 45° and installed. Further, the sizes of the polarization beam splitters R, G, and B and the dichroic mirrors $R_1$, $R_2$, $B_1$, and $B_2$ were optimized so that a whole image of the liquid crystal display devices R, G, and B in this case can be displayed.

As a result, an image on the screen was rotated at 45°. The size of each of the polarization beam splitters R, G, and B and the dichroic mirrors $R_1$, $R_2$, $B_1$, and $B_2$ was increased by 1.5 times or larger and the weight was increased by three or more times.

According to the invention, a reflection type liquid crystal projector with a high contrast ratio can be obtained.

What is claimed is:

1. A liquid crystal projector comprising an optical system having a liquid crystal display device including a plurality of pixels, driving means for driving the pixels in the liquid crystal display device, and polarization means, and a light source, wherein said liquid crystal display device has an active device connected to a reflective electrode, said driving means applies driving voltages to said pixels so that they have different polarities in every row of pixels, a liquid crystal layer is aligned at 75° to 105° relative to the direction of an electric field between electrodes, and an optical rotator is provided between the liquid crystal display device and the polarization means.

2. The projector according to claim 1, wherein four sides of said liquid crystal display device are parallel to the electric vector of linearly polarized light produced by the polarization means, and said optical rotator changes the linearly polarized light produced by the polarization means by 45° to the alignment direction of the liquid crystal display device.

3. The projector according to claim 1, wherein said liquid crystal layer is processed so that its alignment direction is inclined at 90° to the direction of the electric field between electrodes and said optical rotator rotates the electric vector of the linearly polarized light which is reflected by the reflective electrode of the liquid crystal display device and enters the polarization means at a angle of 45°.

4. The projector according to claim 1, wherein said optical rotator is a birefringent medium having a twist structure, the twist angle of the twist structure is 45°, and an optical major axis on an adjacent face of the polarization mean is parallel to or perpendicularly crosses the electric vector of the linearly polarized light produced by the polarization means.

5. The projector according to claim 1, wherein one or more birefringent films are provided between said liquid crystal display device and the optical rotator, the slow axis of said birefringent film is parallel to or perpendicularly crosses the alignment direction of the liquid crystal layer, and synthesized retardations of said birefringent film and the liquid crystal layer coincide with each other within 10 nm at 0.5 n$\lambda$ of a main wavelength region of incident light when (n) is set to an integer, $\lambda$ is set to the wavelength of light, and an arbitrary voltage $V_B$ is applied to the liquid crystal layer.

6. The projector according to claim 1, wherein the birefringence $\Delta n$ of the thickness (d) of said optical rotator and the wavelength $\lambda$ is set so as to satisfy $4d \cdot \Delta n/\lambda = \sqrt{(4m^2-1)}$ where m is an integer at a main wavelength $\lambda$ of incident light.

7. A liquid crystal projector comprising an optical system and a light source, said optical system including a liquid crystal display device, driving means for driving the liquid crystal display device, polarization means formed between said liquid crystal display device and said light source, and an optical rotator formed between said polarization means and said liquid crystal display device, wherein said liquid crystal display device is an electrically controlled birefringence liquid crystal display device having a pair of substrates and a liquid crystal layer held by the pair of substrates, and the substrate of said pair of substrates which is adjacent to said polarization means has a plurality of scanning lines, a plurality of signal lines formed so as to cross said plurality of scanning lines, active devices formed at the crossing points, a plurality of pixel electrodes connected to the active devices, and an aligned film which is formed on the face in contact with said liquid crystal layer and is aligned at an angle from 75° to less than 105° to the extending direction of said plurality of signal lines.

* * * * *